(12) United States Patent
Berard et al.

(10) Patent No.: US 10,114,166 B2
(45) Date of Patent: *Oct. 30, 2018

(54) LUMINOUS GLAZING UNIT FOR ARCHITECTURAL USE OR USE IN FURNISHINGS OR A MEANS OF PUBLIC TRANSPORT

(71) Applicant: SAINT-GOBAIN GLASS FRANCE, Courbevoie (FR)

(72) Inventors: Mathieu Berard, Paris (FR); Brice Dubost, Courbevoie (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/563,282

(22) PCT Filed: Mar. 25, 2016

(86) PCT No.: PCT/FR2016/050687
§ 371 (c)(1),
(2) Date: Sep. 29, 2017

(87) PCT Pub. No.: WO2016/156721
PCT Pub. Date: Oct. 6, 2016

(65) Prior Publication Data
US 2018/0074251 A1    Mar. 15, 2018

(30) Foreign Application Priority Data

Apr. 3, 2015 (FR) .................................. 15 52909

(51) Int. Cl.
*F21V 7/04* (2006.01)
*F21V 8/00* (2006.01)
(Continued)

(52) U.S. Cl.
CPC ........ *G02B 6/0043* (2013.01); *B32B 17/1011* (2013.01); *B32B 17/10036* (2013.01);
(Continued)

(58) Field of Classification Search
CPC .. G02B 6/0041; G02B 6/0051; G02B 6/0036; G02B 6/0065; G02B 6/0038;
(Continued)

(56) References Cited

U.S. PATENT DOCUMENTS

2018/0074251 A1* 3/2018 Berard ................. G02B 6/0043
2018/0086028 A1* 3/2018 Berard ............. B32B 17/10541

FOREIGN PATENT DOCUMENTS

CN         202929237 U       5/2013
WO         WO 97/08252       3/1997
(Continued)

OTHER PUBLICATIONS

International Preliminary Report on Patentability and the Written Opinion of the International Searching Authority as issued in International Patent Application No. PCT/FR2016/050687, dated Oct. 3, 2017.
(Continued)

*Primary Examiner* — Thien T Mai
(74) *Attorney, Agent, or Firm* — Pillsbury Winthrop Shaw Pittman LLP

(57) ABSTRACT

A luminous glazing unit for architectural use or use in furnishings or a system of public transport, includes a first glazing pane, made of organic or mineral glass, of refractive index n1 of at least 1.4 with first and second main faces; a light source, coupled to the first glazing pane; and a light-extracting system including a scattering layer of width of at least 1 cm including scattering dielectric particles bound by a transparent matrix of refractive index n2. The scattering particles are mainly microparticles that are spaced apart (Continued)

from one another and that include a shell made of a transparent dielectric material and making contact with the transparent matrix, the shell surrounding a core of refractive index n3 of at most 1.15 and of largest dimension called D3 in a range extending from 5 μm to 200 μm, the microparticles having a largest dimension called D' smaller than 2D3.

22 Claims, 2 Drawing Sheets

(51) Int. Cl.
  *B32B 17/10*  (2006.01)
  *G09F 21/04*  (2006.01)
  *G09F 13/18*  (2006.01)
  *G02B 5/02*  (2006.01)
  *B60Q 3/208*  (2017.01)
  *B60Q 3/47*  (2017.01)
  *B60Q 3/64*  (2017.01)
  *B60Q 9/00*  (2006.01)

(52) U.S. Cl.
  CPC .. *B32B 17/10541* (2013.01); *B32B 17/10614* (2013.01); *B32B 17/10761* (2013.01); *B32B 17/10788* (2013.01); *G02B 5/0242* (2013.01); *G09F 13/18* (2013.01); *G09F 21/04* (2013.01); *B32B 2419/00* (2013.01); *B32B 2605/006* (2013.01); *B60Q 3/208* (2017.02); *B60Q 3/47* (2017.02); *B60Q 3/64* (2017.02); *B60Q 9/00* (2013.01)

(58) Field of Classification Search
  CPC ...... G02B 6/0046; G02B 5/02; G02B 6/0016; G02B 27/0101; G02B 5/0221; G02B 5/0231; B32B 17/10541; B32B 2307/412; B32B 7/12; B32B 17/10018; B32B 17/10779
  See application file for complete search history.

(56) References Cited

FOREIGN PATENT DOCUMENTS

WO WO 2004/025334 A2 3/2004
WO WO 2008/059170 A2 5/2008
WO WO 2010/049638 A1 5/2010

OTHER PUBLICATIONS

International Search Report as issued in International Patent Application No. PCT/FR2016/050687, dated Jun. 21, 2016.
Notice of Allowance as issued in U.S. Appl. No. 15/563,232, dated Jun. 6, 2018.

* cited by examiner

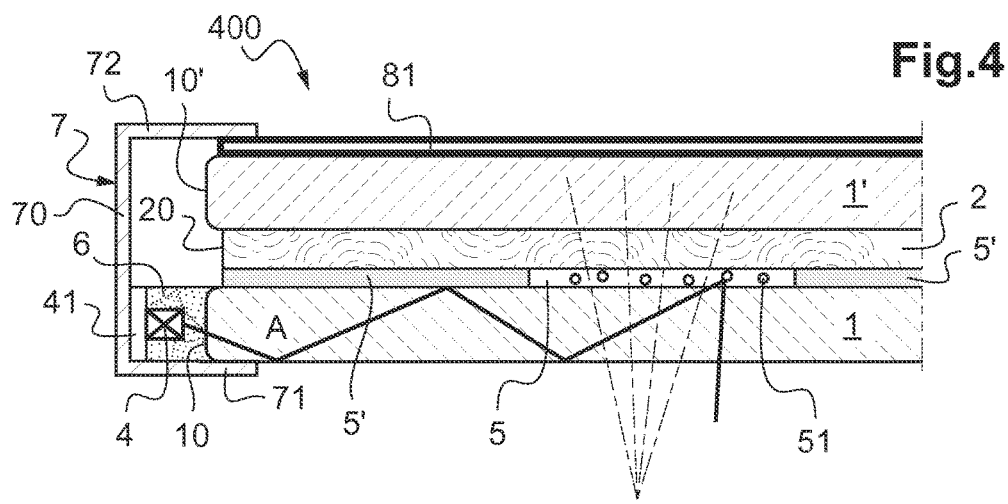
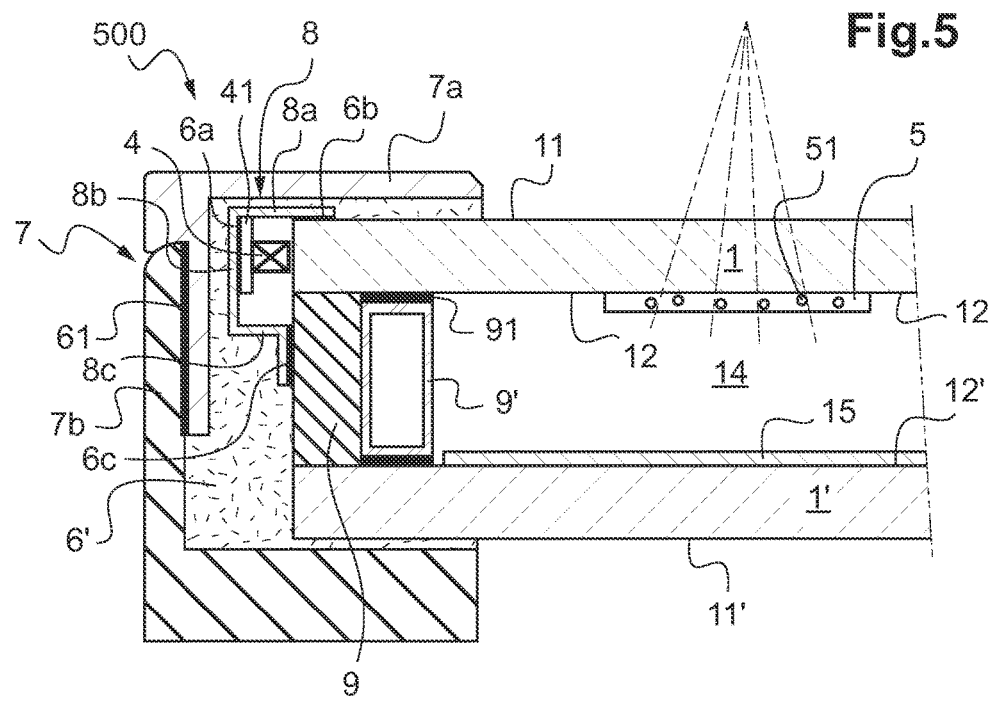

LUMINOUS GLAZING UNIT FOR ARCHITECTURAL USE OR USE IN FURNISHINGS OR A MEANS OF PUBLIC TRANSPORT

CROSS-REFERENCE TO RELATED APPLICATIONS

This application is the U.S. National Stage of PCT/FR2016/050687, filed Mar. 25, 2016, which in turn claims priority to French patent application number 1552909 filed Apr. 3, 2015. The content of these applications are incorporated herein by reference in their entireties.

The present invention relates to a luminous (or "illuminating") glazing unit, in particular a glazing unit employing light-emitting diodes.

Light-emitting diodes or LEDs have for a few years been employed to provide decorative illumination. The advantage of diodes is their long lifetime, their luminous efficacy, their robustness, their low power consumption and their compactness, making devices employing them more durable, and meaning they require less maintenance.

More recently, light-emitting diodes have been used in luminous glazing units. The light emitted by the diodes is introduced via an edge face into a glazing pane, which forms a guide, the light being extracted from the glazing pane by a scattering layer (a layer such as an enamel layer containing dielectric scattering particles) on the glazing pane, the area of which defines the luminous pattern. The scattering layer is too visible to the user in the off (turned off) state. The luminous glazing unit then has a very cloudy and even most often opaque appearance in the zone of the scattering layer.

The present invention has therefore sought to develop a new luminous glazing unit, more particularly for architectural use or use in furnishings (this term including (household, refrigerated, street, etc.) equipment) or even a means of public transport, in particular one employing light-emitting diodes, better preserving transparency in the off state and even without too greatly decreasing the luminance of this glazing unit in the on state, while preferably remaining compatible with industrial requirements (simplicity, ease and rapidity of production, reliability, etc.).

For this purpose, the subject of the present invention is a luminous glazing unit, comprising:

- a glazing module with an edge face and (external) main faces denoted face A and face B, said glazing module including at least one first glazing pane made of organic or mineral glass, said (transparent) first glazing pane, which has a first main face and a second main face (and a first edge face), having a refractive index $n1$ of at least 1.4 at 550 nm (better still in all the visible spectrum) and preferably lower than 1.65 and even lower than 1.55 or indeed even lower than or equal to 1.53 at 550 nm (better still in all the visible spectrum) and preferably from 1.5 to 1.53, said first glazing pane in particular being a transparent, preferably clear and even extra-clear, and even tempered (bare or already coated) mineral glazing pane, said glazing module (and even the luminous glazing unit) in particular having (in all or some of the glazed area) a non-zero light transmission (TL) (it remains possible to see through the glazing module and the luminous glazing unit at least in the glazed area);
- a source of (visible) light, preferably on the periphery of the glazing module, preferably a set of light-emitting diodes (in one or more rows on a first printed-circuit carrier i.e. a carrier such as a PCB (printed circuit board)) in particular a strip along the edge face of the first glazing pane, or even a light source that comprises an extracting optical fiber with a primary source of light (one or more diodes),
- the light source being optically coupled to the glazing module preferably via the edge face of the glazing module or even via face A or face B (border thereof), and in particular optically coupled to the first glazing pane preferably via the first edge face or even via the first or second main face (border thereof) in particular with a diode housing, the glazing module (in particular the first glazing pane) thus forming a guide of light emitted by the light source; and
- light-extracting means for extracting the guided light in order to form a scattering zone (luminous in the on state) of width of at least 1 cm, and even of at least 5 cm (width smaller than or equal to its length, width naturally to be distinguished from thickness, its length preferably being larger than 5 cm and even than 10 cm), said light-extracting means including (or even consisting of) a scattering layer comprising scattering dielectric particles (that are spaced apart from one another) bound by a transparent (preferably colorless) matrix of refractive index $n2$ at least equal to $n1$ or such that $n1-n2$ is at most 0.15, even at most 0.1 or better still at most 0.05 at 550 nm (better still in all the visible spectrum) and even better still at most 0.02 at 550 nm (better still in all the visible spectrum), said scattering layer being associated with one of the first or second faces (making optical contact with one of the first or second faces), said scattering layer preferably making direct contact with one of the first or second faces and even being directly deposited on one of the first or second faces.

Furthermore, the scattering particles are mainly (in number) microparticles that are spaced apart from one another and that comprise a shell made of a (transparent) dielectric material and making contact with the transparent matrix, said shell surrounding a core of refractive index $n3$ of at most 1.15 at 550 nm (better still in all the visible spectrum), better still of at most 1.05 at 550 nm (better still in all the visible spectrum), said core having a largest dimension called $D_3$ in a range extending from 5 μm to 200 μm, the microparticles having a largest dimension called $D'$ smaller than $2D_3$.

The contrast in refractive indices between the core and the matrix (between $n3$ and $n2$) allows the guided light to be scattered more effectively than the conventional solid scattering particles by greatly limiting recourse to multiple scattering that rapidly degrades transmission properties.

Since light extraction with the microparticles according to the invention is more effective, it is thus possible to choose a low concentration, i.e. one clearly lower than a conventional scattering layer, while nonetheless obtaining a sufficiently luminous pattern. Thus, a smaller portion of the light rays passing through the glazing module is affected when the user observes the turned-off glazing unit (in the off state). The scattering layer may darken the first glazing pane or form a very light white veil depending on the illumination/ambient-lighting conditions.

With scattering layers of the prior art, one way to preserve vision through the glazing unit—to achieve an overall transparency—consisted in decreasing the density of the scattering zones, which typically took the form of a network of dots of suitable spacing and size. Thus, most of the rays passing through the faces of the glazing unit were not greatly scattered, but this was at the expense of luminance.

The scattering layer according to the invention may simply be an unapertured layer rather than such a network of subcentimeter-sized dots.

The first face corresponds to face A (by convention).

Preferably at least 80% and better still at least 90% of the total number of scattering particles and even of all the scattering and non-scattering particles of the scattering layer are microparticles according to the invention.

Unless otherwise stated in the present application, a refractive index according to the invention is indicated at 550 nm.

According to the invention, the first glazing pane is a single (or monolithic) glazing unit, such as a sheet of (preferably clear and even extra-clear) mineral glass or a sheet of plastic (such as sheet of polycarbonate).

When the glazing module is a single glazing unit (only with the first glazing pane) it is preferable for it to be planar (not curved) and even (chemically or better still thermally) tempered.

It may be desired to preserve its transparency in order to allow the luminous glazing unit to be seen through and/or to preserve other functionalities such as a mirror function or a decorative function (colored pattern(s), continuous white or colored background, etc.).

According to the invention, when the glazing module is a laminated glazing unit including a first glazing pane/lamination interlayer/second glazing pane, the second glazing pane of the glazing module is a single (or monolithic) glazing pane such as a transparent mineral glass sheet (preferably made of clear and even extra-clear glass). Furthermore, it is preferable for the laminated glazing unit to be planar (not curved) in particular for an architectural use.

The shape of the core of the microparticles is preferably chosen from a sphere, a spheroid, or even a cylindrical or oblong shape.

$D_3$ generally corresponds to the diameter of the core (of substantially spherical shape).

Also preferably, the average dimension of the core, referred to as $D_{3m}$, is in a range extending from 5 μm to 200 μm generally corresponding to the average diameter of the core (of substantially spherical shape).

The microparticles (and better still all the scattering particles) are spaced apart from one another and preferably at least do not form clusters of microparticles; more preferably still they are individual.

$D'$ is chosen to be smaller than $2D_3$ (and therefore smaller than 400 μm and preferably smaller than 200 μm) because this makes it possible to choose a low degree of coverage of microparticles in a transparent matrix while easily preserving transparency.

Preferably, the average dimension of the particle called $D'$, (generally corresponding to the average diameter of the particle (of substantially spherical shape) is smaller than $2D_3$ and even than $2D_{3m}$.

It is also preferable for the thickness of the shell called $E_4$ (mineral shell in particular) to be at least 100 nm and better still at least 500 nm for a better mechanical strength, in particular for hollow microparticles.

Preferably, the scattering layer is:
  devoid of individual particles having a largest dimension (and even preferably an average dimension) of at least 400 μm (and even of at least 200 μm) or at least in a sufficiently small number to not increase haze significantly;
  and/or devoid of particle aggregates having a largest dimension of at least 400 μm (and even of at least 200 μm) or at least in a sufficiently small number to not increase haze significantly.

In one preferred embodiment, said largest dimension $D_3$ (and even the average dimension of the core) is in the range extending from 20 μm to 100 μm and better still the smallest dimension called I3 of the core is such that $I_3 > D_3/10$ or even better still $I_3 > D_3/5$.

In one preferred embodiment, the degree of coverage of the microparticles, which are preferably hollow (preferably forming at least 80% or at least 90% or 95% of the scattering particles and even all the scattering particles), is at most 20% and preferably at most 10% and better still at least 1%.

Practically, to measure the degree of coverage, visual observations are carried out with an optical microscope from above the scattering layer, and the total area occupied by the microparticles (sum of the areas occupied by the microparticles) is determined—the microparticles are visible from above because the matrix is transparent—this calculation being valid whether the microparticles are in a single layer or distributed through the volume of the scattering layer (at various heights). An area rather than a volume occupied by the microparticles is defined for the sake of simplicity.

To determine the area occupied by the microparticles, preferably a reference area of 1 cm$^2$ (in the plane of the glazing pane) is chosen. A plurality of optical microscope images may be necessary to form this reference area, taken in any region of the scattering zone. The evaluation may be repeated in a plurality of regions distributed over the scattering zone, for a calculation even more representative of the degree of coverage.

Preferably, to guarantee the uniformity of the optical properties of the scattering layer, the degree of coverage of preferably hollow microparticles is at most 20% and preferably at most 10% and better still at least 1%, said degree being measured in a reference area taken in any region and better still measured in a plurality of regions in order to cover at least 50% of the area of the scattering zone.

The lower n3, the more the degree of coverage may be lowered for a given level of luminous performance.

In one preferred embodiment, the microparticles (preferably forming at least 80% or at least 90% of the scattering particles and even all the scattering particles) are hollow in order to create the largest possible refractive index difference (n3−n2) with the matrix. Furthermore, these are preferably mineral hollow microparticles (most and even at least 80% or even at least 90% or even all the microparticles), in particular made of metal oxide or better still of mineral glass or of silica. Preferably, most and even at least 80% or even at least 90% or at least 95% of the microparticles or even all the microparticles are hollow, mineral and made of mineral glass or of silica.

Hollow microspheres the shell of which is made of glass are commercially available, manufactured in large amounts and at low cost, and are used at the present time to lighten cement-based construction materials.

The shell is preferably devoid of open porosity, in particular in order to keep air in the core. The external surface of the shell may either be smooth or rough.

Preferably, the dielectric material of the shell is of refractive index n4 such that n4>n3 and such that, in absolute value, n4−n2 is at most 0.2 at 550 nm (better still in all the visible spectrum) and even at most 0.1 at 550 nm (and better still in all the visible spectrum).

In one preferred embodiment, in particular in order to obtain a better resistance to possible heat treatments, the shell of the microparticles is made of a mineral material, preferably mineral glass, or silica, in particular sol-gel silica, or even a metal oxide such as aluminum, zirconium or titanium oxide. Likewise, the core may even also be solid and mineral, for example a core made of porous (sol-gel) silica and a shell made of dense (sol-gel) silica.

Preferably, most of the microparticles (or even at least 80% or at least 90% of the microparticles, and preferably all the scattering particles) are individual, rather than being formed by aggregates of particles. For the sake of simplicity, the (preferably monoparticle) microparticles may preferably be monodisperse in size and of identical material. It is therefore enough to control the dispersion of the (mono) particles during the formation of the scattering layer.

The thickness of the scattering layer may be at least 20 µm, at least 0.2 mm and even (at least) millimeter-scale in size. The thickness of the scattering layer may be larger than the largest dimension of the microparticles.

The microparticles (at least most or even at least 90% of the microparticles, preferably all the scattering particles) may:
- be dispersed in the matrix (or therefore with a shell entirely surrounded by the matrix), the microparticles in particular being incorporated in the matrix before application as a layer;
- or with one or more points of contact with the first or second face of the first glazing pane, the particles being bound by the matrix;
- or on (transparent) adhesive spots on the first or second face of the first glazing pane, the particles being bound by the matrix;
- or on adhesive spots on the face of a lamination interlayer, the particles being bound by the matrix.

The microparticles (at least most or even at least 90% of the microparticles, preferably all the scattering particles) may protrude from the matrix, into the air (in particular for a glazing module with a single glazing pane) with or without one or more points of contact with the first face of the first glazing pane.

The transparent matrix, which is in particular deposited by wet processing, may be made of a material chosen from a polymeric binder such as a paint and in particular a lacquer or a resin.

In particular, the scattering layer may include a layer binding the microparticles made of a material chosen from an organic binder, in particular one based on acrylate, silicone, epoxy, silicone-epoxy or polyurethane, or a mineral binder such as an in particular sol-gel silica and/or a metal oxide, such as an oxide of silicon or silicon and titanium, a titanium oxide, a zirconium oxide or an oxide of titanium and zirconium.

And/or the scattering layer may include a polyvinyl butyral (PVB) or ethylene vinyl acetate (EVA) or even polyurethane (PU) layer binding the microparticles, these materials being the most commonly used thermoplastic lamination-interlayer materials.

The transparent matrix may be defined by an (intrinsic) light transmission of at least 50%, better still of at least 80%, and even of at least 90%, which is deducible from the light transmission of the first glazing pane and transparent matrix (without microparticles) together and the light transmission of the first glazing pane alone.

The preferably hollow microparticles may be in a transparent polymeric film for example polyethylene terephthalate (PET), polycarbonate (PC), or polymethyl methacrylate (PMMA), said film preferably being submillimeter-sized or millimeter-sized or better still at most 1 mm in thickness.

This transparent polymeric film may be added by adhesive bonding with an optical adhesive to the first glazing pane (in particular glazing module with only one single glazing pane).

The matrix may be a layer of one given material or a multilayer; for example, the first layer is an organic binder such as a resin (deposited by wet processing) of thickness smaller than the microparticles, and the second layer, covering the microparticles, is a thermoplastic lamination interlayer (in particular EVA or PVB), the glazing module then being a laminated glazing unit using a second glazing pane.

The preferably hollow microparticles may be bound by a matrix that is a preferably PVB or EVA thermoplastic lamination interlayer, said interlayer preferably being submillimeter-sized or millimeter-sized or better still at most 1 mm in thickness. When the lamination interlayer is of refractive index of lower than n1 (as for PVB) it is preferable for the microparticles to make contact with the first glazing pane so that as many rays as possible reach the microparticles.

It is desirable for the scattering layer to be as invisible as possible and as discreet as possible. Human visual perception is able to clearly distinguish two different effects: scattering at small angles and over a wide angular field.

The light is scattered uniformly in all directions. This causes an attenuation of contrast and an image of cloudy and dulled appearance. Standard ASTMD 1003 defines veiling or haze as being the amount of light that deviates on average by more than 2.5° relative to the incident light beam—expressed in percent.

The light is scattered in a narrow angle with high concentration. This effect describes very well how very fine details may be seen through the sample. The quality of the image clarity must be determined in an angle smaller than 2.5 degrees.

The haze and image clarity are preferably measured by a hazemeter (such as the BYK-Gardner Haze-Gard Plus) preferably according to standard ASTMD D1003 (without compensation) or indeed ISO 13468 (with compensation) applied both for a first glazing pane made of organic glass (in particular polycarbonate) and for one made of mineral glass.

It is preferable to take the measurements before a possible lamination. For example, the illuminant is placed facing opposite the face of the first glazing pane bearing the scattering layer.

Preferably, the scattering layer is directly on the first or second face of the first glazing pane and:
- the haze, called H1, in the off state, of the first glazing pane and scattering layer together is at most 10% and better still at most 5% and even at most 2%; and
- better still the image clarity, in the off state, of the first glazing pane and scattering layer together is at least 90% and better still at least 95%.

Current scattering enamel solutions have a haze of more than 80%.

It is possible to consider the haze, called $H'_1$, in the off state of the first glazing pane together with a layer made of the transparent matrix without the microparticles to be at most 1%.

A first glazing pane made of mineral glass, in particular clear and even extra-clear mineral glass, is preferably chosen.

Preferably, there is no notable color difference between the first glazing pane and the scattering layer together and the first glazing pane without the scattering layer, in particular:

the difference between L1 and L2 is at most 20 and even at most 10;

and even:
the difference between a1* and a2* is at most 10 and even at most 5;
the difference between b1* and b2* is at most 10 and even at most 5.

In one specific configuration, the scattering layer is not directly on the second face but associated via the lamination interlayer. The light source is optically coupled to the first glazing pane (via the first edge face), the lamination interlayer is clear or colorless and of refractive index of such that in absolute value n1−nf is at most 0.15 and better still at most 0.05. The second glazing pane is tinted (and/or has an external scattering element) and includes on its lamination face the scattering layer. In this case, it is possible also to define the haze, called H1, in the off state, of the tinted second glazing pane and scattering layer together, as at most 10% and better still at most 5% and even at most 2% and better still the image clarity, in the off state, of the tinted second glazing pane and scattering layer together is also at least 90% and better still at least 95%.

Furthermore, the luminance is preferably at least 1 cd/m² and even at least 10 cd/m².

The luminous glazing unit may therefore form in one configuration a planar and tempered, clear or extra-clear single glazing unit, the first glazing pane thus being planar and tempered and clear or extra-clear.

When the module is a monolithic glazing unit, the light is guided solely in the first glazing pane by total internal reflection at the first and second faces corresponding to the face A and face B, respectively.

In one preferred embodiment, the light source (preferably diodes on a PCB carrier) is coupled to the first glazing pane (better still to its edge face) and the glazing module may be a laminated glazing unit including said first glazing pane made of preferably clear or even extra-clear mineral glass, on the second-face side a lamination interlayer made of a preferably clear, preferably thermoplastic polymeric material (made of EVA or made of PVB) and a second glazing pane made of preferably clear or even extra-clear mineral glass.

For architectural applications, EVA may be preferred. For public-transport applications, PVB may be preferred.

It is possible to add other functions to the luminous glazing unit with a glazing module that is a laminated glazing unit, such as for example an electrocontrollable device:
a function for preserving privacy: a liquid-crystal device with the scattering layer on the first or second face and the liquid-crystal layer (between two electrodes, between two (EVA or PVB) lamination interlayers;
a function enabling passage from clear to dark: a suspended particle device (SPD) with the scattering layer on the first or second face and the active layer (between two electrodes) between two (EVA or PVB) lamination interlayers;
a tint function: an electrochromic device.

When the glazing module is a laminated glazing unit with a tinted lamination interlayer and/or a tinted second glazing pane and/or with an absorbing or scattering element, guidance of light in the first glazing pane by total internal reflection at the first and second faces is favored.

The lamination interlayer may furthermore be tinted, above all if it does not form all or some of the transparent matrix. The (PVB) lamination interlayer may be clear but with a (limited) tinted zone, such as a band (tinted band of PVB or EVA). It is preferable for the light to be optically coupled to an edge face distinct from that closest to the tinted band. For example, the tinted zone is absent from the zone of the glazing module between the optical coupling edge face and the scattering layer.

If necessary, the second glazing pane may have a reflective or opaque element (decoration, etc.) facing the scattering zone. More broadly, for a monolithic or laminated glazing module, the scattering layer on the second face may be coated with an opaque or reflective layer (decoration etc.).

When the glazing module is a laminated glazing unit with a clear second glazing pane and/or a clear (not tinted) lamination interlayer, the light source may be freely positioned on the edge face of the module even though it is preferable for the source to be facing the first glazing pane and for the scattering layer to be on one of the first or second faces.

When the glazing module is a laminated glazing unit with a second glazing pane and/or a tinted lamination interlayer and/or with an absorbing or scattering element, guidance of light in the first glazing pane by total internal reflection at the first and second faces is favored.

In this case, if it is desired for the largest number possible of rays to propagate in the first glazing pane:
the light source is facing the first edge face of the first glazing pane, preferably with the emitting face of the light-emitting diodes centered on the first edge face;
the scattering layer is directly on the first or second face of the first glazing pane; and
preferably the refractive index of of the lamination interlayer is smaller than n1 by at least 0.01 at 550 nm, as for PVB, above all if distinct from the transparent matrix (on the scattering layer).

Alternatively or cumulatively, when the glazing module is a laminated glazing unit with a tinted lamination interlayer and/or a second tinted glazing pane and/or with an absorbing or scattering element, a layer (forming an optical isolator), such as a layer of porous (sol-gel) silica, of refractive index of at most 1.3 and even of at most 1.2 at 550 nm (better still in all of the visible) may be on the second face (lamination side) opposite the first face. The scattering layer is on the first or side of the second face, this layer forming an optical isolator being adjacent the scattering zone if the scattering layer is on the second face.

Preferably, the scattering layer is in the interior of the laminated glazing unit, in particular on the (lamination) second face of the first glazing pane and not on the first face because it is then protected from the exterior environment (abrasion, dirt) and the glazing module preserves the perfectly smooth appearance of a glazing unit without a scattering layer.

If the scattering layer is on the lamination face of the second glazing pane then preferably, in absolute value, nf−n1<0.15 and better still at most 0.05 so that the maximum number of rays reach the scattering layer.

If it is a question of a laminated glazing unit, it is thus possible to have the following configurations:
first glazing pane (coupled to the light source)/optical isolator/lamination interlayer/decorative layer/second glazing pane;
first glazing pane (coupled to the light source)/optical isolator/lamination interlayer/second glazing pane/decorative layer;
first glazing pane (coupled to the light source)/discontinuous optical isolator adjacent to the scattering layer/lamination interlayer/second glazing pane;

first glazing pane (coupled to the light source)/discontinuous optical isolator/lamination interlayer/scattering layer facing the one or more discontinuities/second glazing pane.

Thus, the light source (preferably diodes on a PCB carrier) may be coupled to the first glazing pane (better still its edge face) and an optical isolator of refractive index lower than n1 is on the second face, in particular a porous (sol-gel) silica layer of refractive index of at most 1.3 even at most 1.2 and better still of thickness of at least 200 nm even of at least 400 nm and preferably of at most 1 µm. This porous sol-gel silica layer is described in patent application WO2008/059170 in particular in FIG. 11. The scattering layer is on the first face or the side of the second face, and when the scattering layer is on the second-face side, the porous silica layer has one or more discontinuities. Furthermore, the glazing module is optionally a laminated glazing unit including said first glazing pane made of preferably clear or even extra-clear mineral glass, and second-face side a lamination interlayer made of an optionally tinted (above all if the scattering layer is on the second face or first face) preferably thermoplastic polymeric material, and a second glazing pane made of mineral glass optionally including an absorbing and/or scattering (colored etc.) layer called a decorative layer, which is in particular opaque or even a mirror.

The porous silica layer may be on either side of the scattering layer or even just in the upstream zone between the coupling edge and the closest edge of the scattering layer.

The porous silica layer may also be useful in the case of a glazing module made up of a single glazing unit. The scattering layer may be on the first face (face A) and may be useful under an absorbing scattering or tinted layer, for example a decorative layer such as the layer of paint of the Planilaque or Decolaque products from the Applicant, a wide range of tints being available (warm, cold metallic), or an enamel layer.

Alternatively, in the case of a glazing module made up of a single glazing unit, the porous silica layer is discontinuous and the scattering layer is in the one or more discontinuities on the second face.

It is also preferable to choose a (clear or tinted) lamination interlayer that is the least hazy possible, i.e. one with a haze of at most 1.5% and even at most 1%.

The glazing module may alternatively be a laminated glazing unit including said first glazing pane made of preferably clear or extra-clear mineral glass, a lamination interlayer made of a preferably clear, preferably thermoplastic polymer material (EVA or PVB), and a second glazing pane preferably made of in particular clear or extra-clear mineral glass, and the microparticles are bound by the polymeric material of the lamination interlayer forming all or some of the transparent matrix. Mineral shells and even hollow microparticles, such as hollow silica or glass beads, are preferably chosen.

Preferably, the scattering layer is in the interior of the laminated glazing unit, in particular on the second (lamination) face of the first glazing pane and not on the first face or face A because it is then protected from the exterior environment (abrasion, dirt) and the glazing module preserves the perfectly smooth appearance of a glazing unit without a scattering layer.

The luminous glazing unit may form an architectural glazing unit or a glazing unit used in furnishings or a means of public (rail, water or land) transport, in particular it may be used:

architecturally: window (curtain wall, skylight) in particular in a glazed door or, in the interior in a partition, door etc.;

in a commercial refrigerated appliance;

in a piece of interior furniture;

in piece of street or garden furniture;

or even in a public means of land transport (bus, coach, motorcoach), of water transport (boat) or of rail transport (train, subway train, tram).

In position mounted in the means of public (rail, land or water such as a cruise ship) transport, in the case of a single side window, the face A is the exterior-side face conventionally denoted face F1 and the scattering layer is preferably on the second face opposite face A, and therefore the innermost face, face F2.

In position mounted in the means of public (preferably land or water) transport, the luminous glazing unit may be a laminated roof (internal illumination desired), the face A is the face on the side of the interior of the means of public transport, which face is conventionally denoted face F4, and the scattering layer is preferably on the second face called F3. Furthermore, in the case of a roof made up of a single (glass, polycarbonate, etc.) glazing unit, face A is the face on the side of the interior of the means of public transport, which face is conventionally denoted face F2, and the scattering layer is preferably on the first face F2.

In position mounted in the means of public (preferably land or rail) transport, the luminous glazing unit may be a laminated windshield. For a luminous signal to be seen by the driver (anticollision detection for a bus, coach or motorcoach, detection of too small a stopping distance, or detection of presence on the track for a train, tram or subway train), face A is the interior-side face conventionally denoted face F4 and the scattering layer is preferably on the first glazing pane, which is the innermost glazing pane, in particular on face F3.

In position mounted in the means of public (land, rail or water) transport, the luminous glazing unit may be a laminated side window. For internal illumination, face A is preferably the interior-side face conventionally denoted face F4. The scattering layer is then preferably on the first glazing pane, which is the innermost glazing pane, in particular on face F3. It is possible to place an opaque or reflective element facing the scattering layer on the second glazing pane or even on the scattering layer (side opposite the first glazing pane). Otherwise, for a luminous signal to be seen on the exterior (request for assistance, etc.), face A is the exterior-side face conventionally denoted face F1 and the scattering layer is preferably on the first glazing pane, which is the outermost glazing pane, in particular on face F2.

If an optical isolator (described in more detail below) is added between the first glazing pane and the second glazing pane, it is possible to provide (independently) both interior illumination (light guided in the first glazing pane coupled to the first light source) and an exterior signal with another, interior scattering zone—of distinct pattern and/or color, intermittent, etc. (light guided in the second glazing pane coupled to a second light source).

In the context of interior design (homes, offices, shops) the luminous glazing unit may be a laminated glazing unit in particular forming:

a partition;

a mirror, in particular a partial mirror (scattering layer in a zone other than the mirror zone);

what is called a decorative glazing unit including an opaque and/or colored decorative layer on the second glazing pane, said glazing unit preferably comprising an optical isolator as mentioned above, the scattering layer being on the first glazing pane and the light source being coupled to the edge face of the first glazing pane;
a tabletop; or
a totem (in a shop).

The scattering layer is then preferably on the first glazing pane lamination-face side (to protect it).

In the context of interior design (homes, offices, shops) or outdoor furnishings (markets, fairs, etc.) the luminous glazing unit may be a monolithic glazing unit in particular forming:
a partition;
a shower screen or a glazing panel of an appliance or piece of furniture;
a tabletop;
a totem;
a mirror, in particular a partial mirror (scattering layer in a zone other than the mirror zone);
what is called a decorative glazing unit including an absorbing and/or scattering decorative layer (kitchen splashback, etc.) with an optical isolator as mentioned above, the scattering layer being on the first glazing pane and the light source being coupled to the edge face of the first glazing pane;
a glazing panel of a piece of street furniture, such as a bus shelter;
a balustrade glazing panel;
a showcase glazing panel, in particular for a refrigerated showcase (food counter, etc.);
a display (shopfront) or a shelf (of an appliance, even a refrigerator, or a piece of furniture); or
a greenhouse glazing panel.

The luminous glazing unit may be an insulating glazing unit (preferably a double glazing unit) and may therefore include an additional glazing pane with third and fourth main faces, the third face, the innermost, being spaced apart from the glazing module (most often forming a single glazing unit) by a gas-filled cavity (filled with air or a neutral gas such as argon). A framing first polymeric seal is arranged on the periphery of the third face and making contact with the glazing module and preferably the first face or the second face of the first glazing pane.

The insulating glazing unit may even form a triple glazing unit and furthermore include another additional glazing pane with fifth and sixth main faces, the fifth face, the innermost, being spaced apart from the additional glazing pane by another gas-filled cavity (filled with air or a neutral gas such as argon), a framing second polymeric seal being arranged on the periphery of the fifth face.

The insulating luminous glazing unit may be a side window of a train, tram or subway train, a door of a refrigerated appliance (freezers included) in particular of a commercial (shop) cabinet refrigerator, a window and in particular a skylight, or a glazed door.

Thus, it is known to use an insulating glazing unit in the door of a refrigerated enclosure in which cold or frozen products are displayed, these products possibly being items of food or drinks or any other products that need to be kept cold—pharmaceutical products or even flowers for example. A low-E coating is preferably on the innermost glazing pane and on the face oriented toward the internal space. Preferably, the low-E coating is on the additional glazing pane.

When the products kept in a refrigerated enclosure must remain visible, as is the case in many current commercial premises, the refrigerated enclosure is equipped with glazed portions that transform it into a refrigerated "display", such "displays" commonly being referred to as "refrigerated display cabinets". There are a number of variants of these "displays". Certain take the form of cabinets and then it is the door itself that is transparent, others take the form of chests and it is the horizontal cover (door placed horizontally) that is glazed in order to allow its contents to be seen.

In the context of an application inside a building, in particular to a professional piece of refrigerated equipment, such as a door of an upright refrigerated appliance, a double glazing unit will preferably be used. Face A is the face on the side of the exterior of the piece of equipment. The scattering layer is preferably on the first glazing pane, which is the outermost of the piece of equipment. The scattering layer may be on the gas-filled-cavity side (to protect it).

Otherwise, in the position mounted in a means of rail transport (train, etc.), the luminous glazing unit may be a side window forming a double glazing unit (and even a double glazing unit including a laminated glazing unit), or even a triple glazing unit.

To provide internal illumination, face A is the face on the side of the interior of the means of rail transport and the scattering layer is preferably on the first glazing pane which is the innermost. In particular, the glazing module is a monolithic interior-side glazing unit and the additional glazing pane is on the exterior side and is laminated to another glazing pane for additional safety (with respect to impacts coming from the exterior). Otherwise, for a luminous signal (alarm, etc.) face A is then the face on the side of the exterior of the means of rail transport and the scattering layer is preferably on the first glazing pane, which is the outermost glazing pane. The scattering layer may be on the gas-filled-cavity side (to protect it). It is possible (independently) to have both a luminous zone on the innermost glazing pane (therefore the light source coupled to the first glazing pane and the scattering layer on the first glazing pane) and another luminous zone on the additional glazing pane (and therefore another light source coupled to the (optionally laminated) additional glazing pane and another scattering layer associated with or on the additional glazing pane. For example (at different instants), the interior illumination is white and the exterior signal red and intermittent.

In the context of an application to a building facade, in particular a window (roof included) or a (sliding, hinged, etc.) glazed door, a double or even triple glazing unit will preferably be used. To provide internal illumination, face A is the face on the side of the interior of the building. The scattering layer is preferably on the first glazing pane, which is the innermost. Otherwise, for illumination to be seen from the exterior (architectural lighting, etc.) face A is then the face on the side of the exterior of the building and the scattering layer is on the first glazing pane, which is the outermost glazing pane. The scattering layer may be on the gas-filled-cavity side (to protect it). It is possible (independently) to have both a luminous zone on the innermost glazing pane (therefore the light source coupled to the first glazing pane and the scattering layer on the first glazing pane) and another luminous zone on the additional glazing pane (and therefore another light source coupled to the (optionally laminated) additional glazing pane and another scattering layer associated with or on the additional glazing pane. For example (at different instants), the interior illumination is white and the exterior illumination is colored and intermittent.

The luminous glazing unit (laminated, single glazing unit or insulating glazing unit) may include a profile for mounting the glazing unit, for example one made of metal (aluminum etc.), facing the edge face of the luminous glazing unit and even on at least one of the external main faces of the luminous glazing unit, the light source (diodes) being in the volume between the mounting profile and the edge face of the glazing module, the profile including a web facing the edge face of the glazing module, preferably a first flange (L-shaped cross section) and even a second flange (U-shaped cross section).

The mounting profile may be fitted or fastened by adhesive bonding or any other means to the glazing unit.

According to the invention, the second flange of the mounting profile may be movable or removable, making the interior of the profile accessible at any moment, in particular subsequently to installation (partition, etc.). The mounting profile may be provided with a glazing bead.

The light source and in particular the PCB carrier may be fastened (by its back face) to the glazing module by adhesive bonding or be spaced apart from the glazing module and fastened to the mounting profile or to what is called an internal part, which is preferably metal (heatsink) extending widthwise preferably without impinging on the flanges of the mounting profile.

The internal part may be fastened to the mounting profile or placed above or on a shim (in the mounting position on a vertical edge of the glazing module).

In the case of an insulating glazing unit, the mounting profile and/or the internal part preferably do not create a thermal bridge. A seal may be between the mounting profile (such as a framing trim, to form a window) and the external main faces of the luminous glazing unit.

In particular, the mounting profile (frame) of the refrigerated-appliance door (or of a window) is preferably associated with the insulating glazing unit without creating a thermal bridge. The mounting profile preferably comprises:
- an in particular metal first portion (which is dog-legged, of L-shaped cross section, etc.) facing the injection edge and extending over the outermost face of the glazing module, said portion being fastened to the insulating glazing unit preferably with what is called a mounting adhesive (8), the optional mounting adhesive being absent from the space between the light source and the injection edge;
- and an in particular thermally insulating and preferably polymeric second portion that is securely fastened by adhesive means to the first portion, facing the edge face of the additional glazing pane and optionally extending over the innermost face of the glazing module (adhesively bonded to the internal face).

One of the portions is made of metal (preferably the first portion, user-side) the other being thermally insulating and preferably polymeric (preferably the second portion, enclosure-side). The first or second portion may have a hollow zone.

Preferably, the scattering zone is in the glazed area, in particular when the glazing unit includes a mounting profile covering the periphery of faces A and/or B and the scattering zone is spaced apart by a least 2 cm from the edge face of the glazing module (of the first glazing pane) coupled to the light source.

The scattering zone may cover less than 50% of the area of the first glazing pane when it is necessary to preserve a glazed area or a given (mirror, decorative) function in the on state. The glazing module may comprise an identical second light source, in particular employing light-emitting diodes, on its periphery and opposite the first light source (opposite edge face). In particular, for a square or rectangular glazing unit (and more broadly for a glazing unit with corners) the first source may be on a first longitudinal (lateral, respectively) edge face and the second source may be on a second longitudinal (lateral, respectively) edge face.

The glazing module may comprise a plurality of scattering zones of identical or distinct sizes and/or shapes. The extracting means may therefore cover some or all of one or more faces depending on the illumination or effect sought (in the form of bands placed on the periphery of one of the faces to form a luminous frame, logos or patterns, etc.).

The extracting means may be made up of a number of segments, for example identical or distinct, continuous or discontinuous patterns, and may be of any geometric shape (rectangular, square, triangular, circular, oval-shaped, etc.), and may form a drawing or a symbol (arrow, letter, etc.). It is easily possible to obtain industrially reproducible and controllable delimitation of the zones. The glazing unit may thus comprise a plurality of extracting zones (scattering layers) in order to form a plurality of luminous zones on the glazing unit.

Additional extracting means may if needs be be provided, for example one face of the first glazing pane may also be frosted, sandblasted, screen-printed, etc., or the thickness of the glass may also be etched, etc.

The illumination/extraction may be adjusted to provide ambient lighting, light for reading, a luminous signal, illumination at night or to display information of any nature, such as a drawing, logo, alphanumeric symbol or other symbols, and may also be activated by remote control. The light may be continuous and/or intermittent, monochromatic and/or polychromatic, white, etc.

The first glazing pane (and the second glazing pane in the case of a laminated glazing unit) may be any type of flat (or optionally curved) glass (the glass, when it is a question of coating curved surfaces, being bent by bending processes known to those skilled in the art). It is a question of monolithic glass panes, i.e. panes composed of a single sheet of mineral glass, which may be produced by the float process, allowing a perfectly flat and smooth sheet to be obtained, or by drawing or rolling processes.

By way of examples of glazing materials, mention may be made of float glass, optionally chemically or thermally hardened or tempered, having a conventional soda-lime composition, an aluminum borosilicate, sodium borosilicate or any other composition.

The first glazing pane may be parallelepipedal, with sheets or main faces that are rectangular, square or even any other shape (round, oval, polygonal). It may be various sizes, and in particular large in size, for example of area larger than 0.5 or 1 m$^2$. Its thickness is generally a least 1 mm, in particular 2 to 20 mm and for example between 3 and 5 mm.

Mineral glass has multiple advantages, in particular a good resistance to heat (it may thus be close to the light sources, for example diodes, despite the fact that they constitute hot spots; it also meets the requirements of fire-safety standards) and a good mechanical strength (it is thus easy to clean and scratch resistant).

The first glazing pane may (depending on the esthetic rendering, the desired optical effect, the destination of the glazing unit, etc.) be a clear glass (light transmission $T_L$ higher than or equal to 90% for a thickness of 4 mm), for example a glass of standard soda-lime composition such as Planilux® from Saint-Gobain Glass, or an extra-clear glass ($T_L$ higher than or equal to 91.5% for a thickness of 4 mm), for example a soda-lime-silica glass with less than 0.05% Fe III or $Fe_2O_3$ such as the glass Diamant® from Saint-Gobain Glass, or the glass Optiwhite® from Pilkington or the glass B270® from Schott, or a glass of another composition described in document WO04/025334.

The glass of the first glazing pane may be neutral (colorless), or (slightly) tinted or colored (glass VENUS or TSA from Saint-Gobain Glass, etc.); have undergone a thermal or chemical treatment such as a toughening, annealing or tempering treatment (in particular to obtain a better mechanical strength) or a bending treatment and is generally obtained by the float process.

The first glazing pane—and even the glazing module—may have this or these properties "intrinsically", i.e. bare, without the presence of any coating, or be a transparent substrate that is coated on at least one surface (other than its edge face) with a coating made up of one or more layers and having this or these properties integrated over the equivalent of the entirety of its area. The light transmission is measured according to standard ISO 9050:2003 (also mentioning optical transmission) using illuminant D65, and is the total transmission (in particular integrated over the domain of the visible and weighted by the curve of sensitivity of the human eye), taking into account both direct transmission and possible diffuse transmission, the measurement for example being carried out using a spectrophotometer equipped with an integrating sphere, the measurement at a given thickness then being converted if needs be to the reference thickness of 4 mm according to standard ISO 9050:2003.

The luminous glazing unit preferably has a glazed area (area in which transparency is preserved) so that an object may be seen behind it. The glazed area is optionally adjacent to or framed by an enamel or other masking layer or mirror layer or decorative layer. The luminous glazing unit (in particular the glazing module, whether laminated or not) may have a nonzero light transmission TL.

For a roof of a means of public transport (preferably laminated, in particular of a train), a light transmission TL that is non-zero and even at least 0.5% or at least 2% and at most 10% and even at most 8%, is preferred. For a windshield of a means of public transport (preferably laminated, in particular of a train), a light transmission TL that is non-zero and at least 70%, is preferred. For a double or triple glazing unit (window, door of a refrigerated appliance in particular of a cabinet refrigerator, etc.) a light transmission TL that is non-zero and at least 60% and even at least 70% is preferred. These values of TL may be in a zone with the scattering layer and/or adjacent to the scattering layer (and in the glazed area).

If needs be, the first glazing pane could be essentially plastic (organic sheet(s)), in order to increase compactness and/or lightness, or to allow more diverse shapes (generally it comprises at least one mineral glass sheet as indicated above). An organic glass, for example a transparent plastic material, is for example polycarbonate (PC), polyethylene terephthalate (PET), polyurethane (PU) or an acrylic polymer such as polymethyl methacrylate (PMMA). The first glazing pane may thus be made of (preferably rigid or semi-rigid) organic glass preferably such as a polymethyl methacrylate (PMMA) or a polycarbonate (PC).

The glass may have been given a heat treatment at a temperature of 450° C. or more, preferably of 600° C. or more, and is in particular even a pane of tempered curved glass.

The thickness of the first glazing pane is preferably comprised between 2 and 5 mm. The thickness of the second glazing pane is preferably comprised between 2 and 5 mm. It may be preferable for the thicknesses of the two glass panes to be equal.

In the case of a laminated glazing unit, the second glazing pane may be tinted and advantageously has an overall light transmission ranging from 1.0% to 60.0% (in particular from 10.0% to 50.0% and in particular from 20.0% to 40.0%). It may furthermore have an optical transmission (determined as is known by calculating the ratio of the transmitted intensity to the incident intensity at a given wavelength) of at least 0.5% for at least one wavelength, comprised in the domain of the visible, above 420 nm (and up to 780 nm), and preferably of at least 0.5% for all the wavelengths comprised in the domain extending from 420 to 780 nm.

In the case of a laminate, the glazing module comprises at least one lamination interlayer such as an advantageously transparent plastic film (preferably made of PVB or (flexible) PU or a thermoplastic without plasticizer (ethylene/vinyl acetate (EVA) copolymer), etc.), each interlayer for example having a thickness between 0.2 mm and 1.1 mm and in particular between 0.38 and 0.76 mm.

The second glazing pane may also be made of a (preferably rigid or semi-rigid) organic glass such as a polymethyl methacrylate (PMMA)—preferably with a (PU) lamination interlayer—or a polycarbonate (PC)—preferably with a PVB or EVA lamination interlayer.

In the case of a laminate, it is in particular possible to choose as first glazing pane/lamination interlayer/second glazing pane:
mineral glass/PVB/mineral glass;
or even mineral glass/lamination interlayer/polycarbonate;
or even (thick or not) polycarbonate/lamination interlayer/mineral glass.

Alternatively to a laminated structure involving a typically thermoplastic lamination interlayer (sheet), the glazing module (the luminous glazing unit) may comprise only the single or monolithic first glazing pane (for example a sheet) to which is optionally added a functional (tinted plastic, decorative, etc.) film which is self-adhesive or adhesively bonded to the second face of the first glazing pane.

Each optically coupled edge face may be worked, in particular straight and polished.

As defined according to the invention, the luminous glazing unit according to the invention also comprises at least one light source coupled to the guide in order to propagate light (by total internal reflection) inside the guide (in its thickness), which source is advantageously associated with or coupled to the edge face of the guide (in another embodiment, it could optionally be associated with or coupled to one of the main faces (and in particular be housed in a cavity or a groove)).

It is possible to use one or more (optionally identical) light sources, for example electrical sources and/or sources consisting of one or more light-emitting devices (LEDs, etc.). The one or more light sources may be monochromatic (emitting in the blue, green, red, etc.) or polychromatic, or be designed or combined to produce for example white light, etc.; they may be continuous or discontinuous, etc.

The edge face, the corner or the edge of one face of the glazing module (of the first glazing pane) may include a void in which the light sources are placed (it is for example possible to cut (before tempering) the edge of a sheet of a single or laminated glazing unit in order to house diodes therein) and/or the latter may be adhesively bonded, in particular to the edge face (an adhesive with an optical refractive index intermediate between the index of the guide and that of the external medium or of the lens for example is then chosen). The voided zone may form a groove along the glazing module (the first glazing pane) for housing a plurality of sources, said groove not opening or opening onto at least one side in order to facilitate mounting from this side. The sources may be in a protecting means and/or a means for holding them inside the voided zone, in particular a U-shaped profile fastened to the coupling edge face by adhesive bonding, snap fitting, by bolts, etc., and may occupy some or most of the voided zone.

Advantageously (in particular for environmental reasons, reasons of size, of heating, etc.) quasi-point light sources (such as diodes) are used, these sources advantageously being placed along the edge face of the glazing module, this embodiment being simple, economic and effective.

The diodes may be single semiconductor chips (without encapsulation or a collimating lens) that are for example about one hundred μm or one or a few millimeters in size (for example 1 mm in width, 2.8 mm in length and 1.5 mm in height). They may also comprise an optionally temporary protective package in order to protect the chip during handling or to improve compatibility between the materials of the chip and other materials and/or be encapsulated (for example in a low-volume surface mounted device (SMD) encapsulation) in a package, for example made of epoxy resin or nylon or PMMA, encapsulating the chip and having various functions: protection from oxidation and moisture; collimating or focusing/scattering role; wavelength conversion, etc.).

The total number of diodes is defined by the size and location of the zones to be illuminated, by the desired light intensity and by the uniformity required for the light.

The power of each diode is generally lower than 1 W, in particular lower than 0.5 W. Each diode may be "high-power" (power higher than 0.2 W) and/or of luminosity higher than 5 lumens.

The diodes may be (pre-)assembled on one or more PCB (printed circuit board) carriers or carriers with electrical supply tracks, these PCB carriers possibly being fastened to other carriers (profiles, etc.). Each PCB carrier may border the glazing module and be fastened by pinching, wedging, clip fastening, screwing, adhesive or double-sided adhesive tape, etc. The PCB carrier is generally thin, and in particular smaller than or equal to 3 mm, or even 1 mm or even 0.1 mm in thickness or smaller in thickness than the thickness of a lamination interlayer if relevant. A plurality of PCB carriers may be provided, in particular if the zones to be illuminated are very far apart. The PCB carrier may be made of a flexible dielectric or electrical conductor (metal such as aluminum, etc.), be a composite, a plastic, etc. The diodes may be soldered to tracks electrically insulated from the base, and/or to thermal pads on plastic bases, or an electrically insulating and thermally conductive material (adhesive, tape, adhesive tape, double-sided adhesive, thermal conductor, thermal grease, etc.) may fasten or be inserted therebetween for a better dissipation and luminous efficacy and for the longevity of the diodes.

The diodes may comprise or even preferably be single semiconductor chips, for example of width W0 of about one hundred μm or 1 to 5 mm. The width of each diode of the light source is preferably smaller than the thickness of the first glazing pane.

The diodes may optionally comprise a (temporary or permanent) protective package for protecting the chip during handling or to improve the compatibility between the materials of the chip and other materials.

Each diode of the light source may in particular be chosen from at least one of the following light-emitting diodes:

a side-emitting diode, i.e. emitting parallel to (the faces of) the electrical contacts i.e. with a lateral emitting face relative to the PCB carrier; and a diode the main emission direction of which is perpendicular or oblique to the emitting face of the chip.

The diodes preferably have a Gaussian (type) spectrum.

The emission pattern of a diode is conventionally Lambertian with an emission half angle of 60°.

Preferably, the distance between the chips (or the collimating means if present) and the first coupling edge face (the second coupling edge face, respectively) is smaller than or equal to 5 mm and even to 2 mm.

Other types of sources than diodes may optionally be used, if relevant in an ad hoc void, or on an added element. These other light sources may be directly on one of the (for example main) faces of the substrate, or be adhesively bonded to or laminated with another in particular transparent substrate (glass, etc.) using an in particular extra-clear lamination interlayer.

Whatever the light source, the thickness of the source is advantageously small, possibly as little as a few nanometers or tens of nanometers in particular.

In one advantageous embodiment, one or more sensors monitoring the environment and/or the glazing unit may be associated with the light sources and/or with the power supply system of said glazing unit. It is for example possible to use a luminosity detector (photodiode, etc.), a temperature sensor (exterior sensor or sensor integrated into the glass or the light sources), the sensor used for example controlling the power supply of the light sources via a processor or central unit. It is possible to define a sensor measurement value (maximum luminosity for example) beyond which the glazing unit ceases to operate one of its functions (light extraction or activation of the light sources in particular). For a higher value for example, the supply of the glazing unit is turned off and for a lower value, the glazing unit or one of its functions (for example its luminosity level) may be controlled via information received from the one or more sensors. The function of the glazing unit may also be "forced" by the user by deactivation of the sensors.

The sensors may be in the interior (for example of the building, of the means of public transport) or on the exterior. Managing the glazing unit depending on the exterior environment makes it possible for example to improve the durability of the light sources and other components (polymers, electronic components, etc.) as limiting their operation under high luminosity and/or temperature conditions in particular makes it possible to significantly decrease (by between 10 and 20° C. at least) the maximum temperatures to which the light sources may be exposed during use of the product, while nonetheless preserving the functions of the luminous glazing unit. This coupling also makes it possible to automatically adapt the illumination brightness of the glazing unit to exterior luminosity conditions, without the user having to intervene.

The present invention will be better understood and other details and advantageous features of the invention will become apparent on reading about examples of luminous glazing units according to the invention, which are illustrated by the following figures:

FIG. 4 shows a schematic cross-sectional view of a decorative laminated luminous glazing unit in a fourth embodiment of the invention; and FIG. 5 shows a schematic cross-sectional view of a luminous glazing unit that is an insulating glazing unit in a fifth embodiment of the invention.

It will be noted that for the sake of clarity the various elements of the objects shown are not necessarily reproduced to scale.

Figure 1:
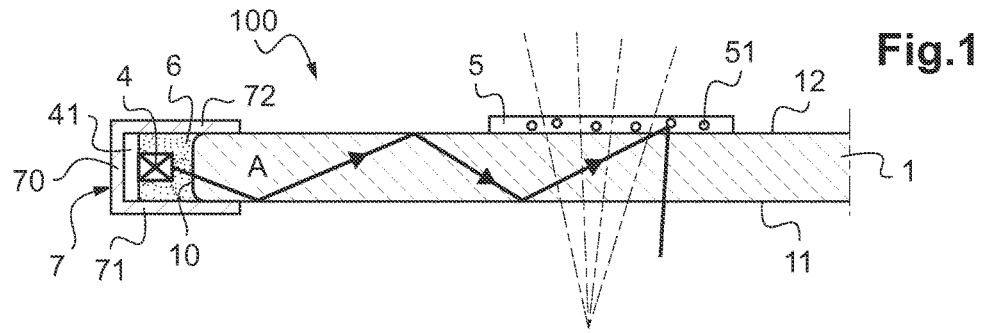
FIG. 1 shows a schematic cross-sectional view of a monolithic luminous glazing unit in a first embodiment of the invention.

FIG. 1 shows a schematic cross-sectional and partial view of a monolithic luminous glazing unit 100 in a first embodiment of the invention.

In FIG. 1, the glazing unit according to the invention includes a glazing module taking the form of a single glazing unit with an edge face and main faces denoted face A and face B. It therefore includes a for example rectangular first glazing pane 1 (dimensions of 300×300 mm for example) made of planar and tempered mineral glass having a first main face 11 corresponding to the face A and a second main face 12 corresponding to face B, and a for example rounded or flat (to prevent flakes) here longitudinal (or as a variant lateral) edge face 10, for example a sheet of extra-clear, soda-lime-silica glass such as Diamant glass sold by Saint-Gobain Glass, of thickness equal for example to 3 mm, said glazing pane having a refractive index n1 of about 1.51 at 550 nm.

The first glazing pane is alternatively made of polycarbonate or even of PMMA.

Light-emitting diodes 4 border the first glazing pane 1. It is here a question of top-emitting diodes. Thus, these diodes 4 are aligned on a PCB carrier 41 facing the first edge face 10, for example a parallelepipedal strip, and their emitting faces are perpendicular to the PCB carrier and to the edge face 10. The PCB carrier is for example fastened by optical (or a transparent double-sided) adhesive 6 to the edge face.

The PCB carrier with the diodes is between the first edge face and a metal (aluminum or stainless steel, to dissipate heat) or even (stiff) plastic profile 7 of U-shaped cross section, including a web 70 facing the first edge face, a first (optional but preferred) flange 71 extending as far as to be facing the peripheral edge of the first face 11 and a second (optional but preferred) flange 72 extending as far as to be facing the peripheral edge of the second face 12. The PCB carrier may be against or fastened to the web 70 (the adhesive 6 optionally being omitted). In the case of side-emitting diodes, the PCB carrier may be against or fastened to the first or second flange.

The light-emitting diodes each include an emitting chip able to emit one or more rays in the visible, which one or more rays are guided in the first glazing pane 1. The diodes are small in size, typically a few millimeters or less and in particular about 2×2×1 mm in size, without optics (lens) and preferably not pre-encapsulated in order to decrease bulk as much as possible.

The distance between the diodes and the edge face 10 is as small as possible, for example from 1 to 2 mm.

The main emission direction is perpendicular to the face of the semiconductor chip that for example has a multi-quantum well active layer in an AlInGaP or other semiconductor technology.

The light cone is a Lambertian cone of +/−60°.

The glazing unit 100 may have a plurality of luminous zones, the one or more luminous zones preferably occupying less than 50% of the area of at least one face, in particular of given geometry (rectangular, square, round, etc.).

The light ray A (after refraction at the edge face 10) propagates by total internal reflection (at the second face 12 and from the face 11 called face A) in the first glazing pane 1 forming a light guide. For the light extraction, a scattering layer 5 is deposited on the second face 12 of the first glazing pane. It includes a preferably colorless transparent matrix 50 of refractive index n2 at least equal to n1 or such that n1−n2 is at most 0.15, incorporating scattering particles 51.

Figure 1A:
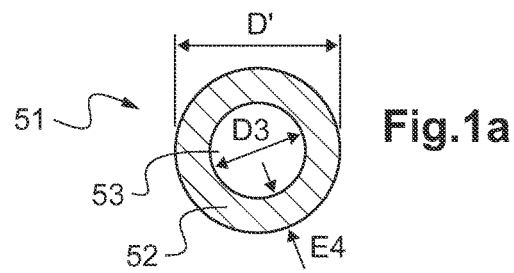
FIG. 1a is a view of a hollow microparticle used for light extraction.

Microparticles that are preferably hollow, formed from a dielectric shell 52 surrounding a gaseous core 53 of refractive index n3 of at most 1.15, preferably air, are chosen, as shown in FIG. 1a.

The diameter $D_3$ (diameter of the core) is in a range extending from 5 μm to 200 μm and better still ranging from 20 μm to 100 μm. The diameter D' of the microparticles (outside diameter of the shell) is smaller than 2 $D_3$. The thickness of the shell is more than 500 nm.

The degree of coverage of the microparticles is preferably 1% to 10%. It is determined by observation by optical microscope.

The scattering zone is rectangular and 10 cm by 10 cm in size. The scattering zone is a continuous, unapertured layer.

By way of illustration, the microparticles are hollow glass microbeads of average diameter D' of 65 μm (product denoted Glass Bubbles K1 sold by 3M) and the shell of which is of submicron-sized thickness E4 of a few hundred nm, and are placed in a colorless resin based on silicone-epoxy denoted SILIKOPON sold by TEGO EVONIK. The resin filled with hollow microbeads is spread over the second face 12 using a motorized bar coater in order to obtain a thickness of 120 μm on the second face 12.

For example, the illuminant is placed on the side opposite to the scattering layer in order to take measurements of haze and image clarity.

In a first example, the concentration of the microspheres is chosen in order to achieve a degree of coverage of 1%. The haze $H_1$ of the first glazing pane with the scattering layer is 1.5% and, in a zone without the scattering layer, the haze is lower than 1%. The image clarity of the first glazing pane with the scattering layer is 99% and, in a zone without the scattering layer, the image clarity is almost 100%. The luminance is higher than 1 cd/m².

In a second example, the concentration of the microspheres is chosen in order to achieve a degree of coverage of 5%. The haze $H_1$ of the first glazing pane with the scattering layer is 5% and, in a zone without the scattering layer, the haze is again lower than 1%. The image clarity of the first glazing pane with the scattering layer is 97% and, in a zone without the scattering layer, the image clarity is again almost 100%. The luminance is about 10 cd/m².

When the diodes are turned off, the first glazing pane coated with the scattering layer is of light transmission $T_L$ of about 88%.

The scattering layer may be deposited before or after tempering, preferably after if it is a question of a resin transparent matrix.

Alternatively, the scattering layer 5 is on face A.

The ray A refracted in the scattering layer 5 encounters a scattering hollow microsphere allowing light to be extracted in particular toward face A.

The small number of hollow microspheres combined with the choice of a transparent matrix allows the haze H1 of the first glazing pane coated with the scattering layer to be limited.

It is possible to choose diodes emitting colored and/or white light in order to provide ambient lighting, light for reading, etc. Red light may be chosen, optionally in alternation with green light, for signaling purposes in a train.

When the diodes are turned on, the extraction may form a luminous drawing, for example a logo or a trademark.

Alternatively, it is possible to add a discontinuous optical isolator on either side of the scattering layer and a decorative layer, for example a continuous colored background. This decorative layer is not necessarily on the scattering layer.

Alternatively, it is possible to add an optical isolator on the second face and a decorative layer, for example a continuous colored background. The scattering layer is then on the first face.

Alternatively, it is possible to add a mirror layer (protected silver-containing layer) on the second face, to form a covering mirror or a partial mirror. The scattering layer is then on the first face.

Figure 2:
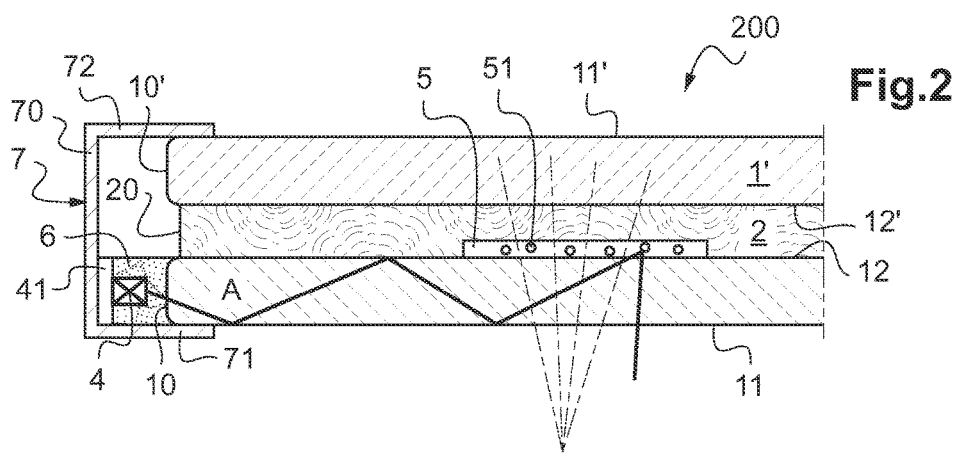
FIG. 2 shows a schematic cross-sectional view of a laminated luminous glazing unit in a second embodiment of the invention.

In FIG. 2, the luminous glazing unit 200 differs from that described in FIG. 1 in that it is a question of a laminated glazing unit which in addition includes:
 a lamination interlayer 2, for example a clear PVB of 0.76 mm thickness, preferably of haze of at most 1.5%, with a here longitudinal edge face 20 substantially aligned with the longitudinal edge face 10, said lamination interlayer having a refractive index $n_f$, lower than n1, equal to 1.48 at 550 nm; and
 a second glazing pane 5 of the same size and same glass composition with a main face called the internal or lamination face 12' facing the second face 12, and another main face 11' corresponding to face B, and an edge face 10' that here is longitudinal.

Guiding occurs in the first glazing pane and for other rays between face A and face B.

In fact, the diodes may be placed anywhere on the edge face of the laminated glazing unit and likewise the scattering layer without excessively penalizing luminance Luminance is increased a little if an optical isolator is added to face 12 on either side of the scattering layer (on either side of the scattering layer if on face 12) or even on the scattering layer.

Alternatively, in particular for architectural applications or for furnishing applications, the lamination interlayer 2 is a clear EVA of 0.76 mm thickness, preferably of haze of at most 1.5% and of refractive index $n_f$ substantially equal to n1. In this case, light is above all guided between face A and face B. Here again, the diodes may be placed anywhere on the edge face of the laminated glazing unit and likewise the scattering layer without excessively penalizing the luminance Alternatively, the second glazing pane 5, of same size, is:
 made of tinted mineral glass for example the glass VENUS VG10 or TSA 4+ sold by Saint-Gobain Glass;
 and/or textured or with a (tinted or scattering) decorative layer on face 11' or on face 12'.

Alternatively or cumulatively, the lamination interlayer is tinted.

In the latter two configurations, the diodes are very preferably placed facing the first glazing pane and the scattering layer is placed on the first glazing pane and PVB is preferred to EVA or any other material of lower index than the glass 1. Luminance is greatly increased if an optical isolator is added to face 12 (on either side of the scattering layer if on face 12).

In one alternative embodiment (not illustrated) of a laminated glazing unit, differing in the absence of the resin from that described in FIG. 1, the microparticles (hollow glass microbeads) are bound by the clear lamination interlayer made of PVB or EVA. For example, the microparticles are spread over the second face (lamination face) of the first glazing pane then the lamination interlayer is affixed before the lamination cycle is carried out. As a precautionary measure, the beads may even be pre-fastened via spots of optical adhesive on the second face, before the lamination. Alternatively, the microparticles are spread over the main face of the lamination interlayer intended to make contact with the first glazing pane then the first glazing pane is affixed before the lamination cycle is carried out. As a precautionary measure, the beads may even be pre-fastened via spots of optical adhesive to this face of the interlayer, before the lamination.

Figure 3:
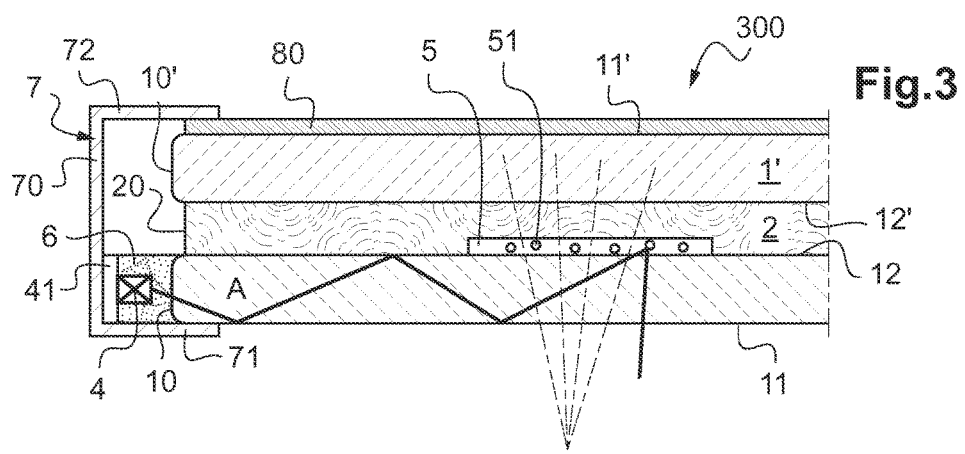
FIG. 3 shows a schematic cross-sectional view of a laminated luminous glazing unit forming a luminous mirror in a third embodiment of the invention.

In FIG. 3, the luminous glazing unit 300 differs from the luminous glazing unit 200 described in FIG. 2 in that the face B is covered with a mirror layer 80, for example a silver-plated layer protected by an overlayer. The mirror function is preserved in the off state in the scattering zone.

It may rather be preferable to place the scattering layer closer to the edge face 10 in order to leave a large central mirror zone (and the scattering layer is then shifted from the mirror layer). It is possible to double the means in order to have two peripheral luminous zones (two vertical or horizontal bands that are unapertured or that take the form of a network of features, and two sets of diodes on opposite edge faces)

Guiding occurs in the first glazing pane and for other rays between face A and face B.

The diodes may be placed anywhere on the edge face of the laminated glazing unit and likewise the scattering layer (excluding face B in any case) without excessively penalizing the luminance.

Luminance is increased a little if an optical isolator is added to face 12 on either side of the scattering layer (on either side of the scattering layer if on face 12) or even on face 12'.

In FIG. 4, the luminous glazing unit 400 differs from the luminous glazing unit 200 described in FIG. 2 firstly in that the face 11' or B is covered with a decorative layer 81, for example an unapertured or patterned colored enamel layer. The luminous glazing unit 400 also differs by the porous sol-gel silica layer of 400 nm thickness deposited on the second face 12 before lamination, said layer being discontinuous in order to leave the adjacent (beside and making contact) scattering layer on the second face 12. Alternatively, the scattering layer 5 is on face 11' or even under the optical isolator.

The decoration remains visible in the off state in the scattering zone.

As a variant, it is possible to print a photo on the face 12' with one or more free zones intended to face one or more scattering zones (design with lamp, luminary, streetlight in a town, etc.).

As a variant, a black or dark (masking) enamel limited to a peripheral zone on face 11' or 12' on the optical-coupling side is thus isolated by the optical isolator 5'.

As a variant, the layer 8 is removed, another scattering layer or the same scattering layer as that on the first glazing pane is used and a second light source is added facing the edge face 10' of the second glazing pane. It is possible to have luminous zone that are turned on independently and of distinct colors.

In FIG. 5, the luminous glazing unit 500 differs from the luminous glazing unit 100 described in FIG. 1 above all in that it is a question of a double-glazed insulating glazing unit, here for a refrigerated-appliance door.

This luminous glazed door 400 comprises a glazing module forming an insulating glazing unit with an external main face A or 11 user-side and an internal main face 11' (shelves-side) including:

- a first glazing pane including the external face A and a first edge face formed from four edges including a first longitudinal edge, said first glazing pane here being a single pane including a first sheet 1 made of glass having a first main face 11 and a second main face 12, the first face therefore being the external face, for example a sheet of extra-clear, soda-lime-silica glass of thickness equal to at least 3.8 mm (4 mm or 6 mm as standard);
- a second glazing pane including the internal face 12' and a second edge face formed from four edges including a second longitudinal edge, said second glazing pane here being a single pane including a second sheet 1' made of glass, with a third face 12' here being the internal face and a fourth main face 11', the faces 12 and 12' being spaced apart by a first gas-filled cavity (filled with air or argon); and
- on the periphery of the faces 12 and 12', a first framing polymeric seal 9 and an insert 9' forming a spacer.

Usually, the insert 9' is fastened to the interior of the glazing unit 500 via its lateral faces to the faces 12, 12' by butyl rubber 91 which also has the role of making the interior of the insulating glazing unit sealtight to water vapor. The insert 9' is positioned recessed into the interior of the glazing unit and close to the longitudinal edges of the edge faces of said glass sheets, so as to form a peripheral groove into which a first polymer seal 9 is injected, this seal being a mastic, for instance a polysulfide or polyurethane mastic. The mastic strengthens the mechanical assembly of the two glass sheets 1, 1' and ensures sealtightness to liquid water or to solvents.

The light source 4 (diodes) is external to the insulating glazing unit. The diodes are optically coupled to the first longitudinal edge. The diodes are again on a PCB carrier 41 and extend facing the first edge. The PCB carrier 41 does not protrude beyond the first edge face in the direction of the external face 11 and here is adhesively bonded by a conductive adhesive 6a to a metal 8b to dissipate heat.

The scattering layer 5 with the microparticles 5 is on the second face 12.

The second glazing pane 1' includes a first layer 15 having a thermal function, on the third face 12'.

The PCB carrier 41 and the source 4 are in a cavity bounded by the injection edge and a part referred to as the bearing part 8. The bearing part 8 is a metal profile, here an—extruded or folded—sheet made of aluminum of thickness of 1.5 mm. This profile 8 has a portion 8c adhesively bonded by a double-sided adhesive tape 6c to the mastic 9. The bearing part 8 does not touch both the first and second glazing panes 1' in order not to form a thermal bridge. It may in particular be spaced apart by 2 mm from the first face 11 so that the source carrier does not protrude toward the external face 11. The bearing part 8 includes a flange 8a fastened to the face 11 by adhesive 6b.

The glazed door 500 furthermore comprises a framing profile 7 fastened to the insulating glazing unit preferably by an adhesive 6' called a mounting adhesive, and masking the first seal 9 and the insert 9'. It forms a longitudinal (vertical in the mounted door) framing jamb 7 fastened to the insulating glazing unit by the mounting adhesive 6'.

The framing jamb 7 is made up of two portions in order to prevent any thermal bridging (case if all metal). A first metal portion 7a, for example a profile of L-shaped cross section, contains a dogleg in order to face the optical-coupling edge and to extend over the external face 11:
- with a portion adhesively bonded to the external face;
- with a portion facing the edge face of the insulating glazing unit (and shifted from the edge face of the second glazing pane).

The second portion 7b is thermally insulating and preferably polymeric and securely fastened via an adhesive 61 to the doglegged first portion 7a, in order to face the edge face of the second glazing pane and to extend over the internal face 11'.

As a variant it may be a question of a window with a suitable framing jamb or even a train side window. The first glazing pane is on the side of the interior of the room or car.

The invention claimed is:

1. A luminous glazing unit comprising:
    a glazing module with an edge face and two main faces, said glazing module including at least one first glazing pane, made of organic or mineral glass, of refractive index n1 of at least 1.4 with first and second main faces;
    a light source optically coupled to the glazing module, the glazing module forming a guide of light emitted by the light source; and
    a light-extracting system configured to extract the guided light in order to form a scattering zone of width of at least 1 cm, said light-extracting system including a scattering layer comprising scattering dielectric particles bound by a matrix, said scattering layer being associated with one of the first or second main faces;
    wherein the matrix is transparent and of refractive index n2 at least equal to n1 or such that n1-n2 is at most 0.15 and wherein the scattering particles are mainly microparticles that are spaced apart from one another and that comprise a shell made of a transparent dielectric material and making contact with the transparent matrix, said shell surrounding a core of refractive index n3 of at most 1.15, said core having a largest dimension $D_3$ in a range extending from 5 μm to 200 μm, the microparticles having a largest dimension called D' smaller than $2D_3$.

2. The luminous glazing unit as claimed in claim 1, wherein a degree of coverage of the microparticles is at most 20%.

3. The luminous glazing unit as claimed in claim 1, wherein the microparticles are hollow.

4. The luminous glazing unit as claimed in claim 1, wherein the dielectric material of the shell is mineral glass, silica or a metal oxide.

5. The luminous glazing unit as claimed in claim 1, wherein said largest dimension $D_3$ is in the range extending from 20 μm to 100 μm.

6. The luminous glazing unit as claimed in claim 1, wherein the scattering layer includes a layer binding the microparticles made of a material chosen from an organic binder or a mineral binder and/or the scattering layer includes a PVB or EVA layer binding the microparticles.

7. The luminous glazing unit as claimed in claim 1, wherein the scattering layer is directly on the first main face or the second main face of the first glazing pane, and, defining the haze H1, in the off state, of the first glazing pane and scattering layer together, H1 is at most 10%.

8. The luminous glazing unit as claimed in claim 1, wherein the scattering layer is directly on the first main face or the second main face of the first glazing pane, and, the image clarity, in the off state, of the first glazing pane and scattering layer together, is at least 90%.

9. The luminous glazing unit as claimed in claim 1, wherein the light source includes a set of light-emitting diodes on a PCB carrier.

10. The luminous glazing unit as claimed in claim 1, wherein the light source is optically coupled to the first glazing pane, wherein a layer of porous sol-gel silica of refractive index of at most 1.3 is on the second main face of the first glazing pane, wherein the scattering layer is on the first main face or a side of the second main face of the first glazing pane and, when the scattering layer is on a side of the second main face, the porous silica layer has one or more discontinuities and the scattering layer faces the one or more discontinuities, and wherein optionally the glazing module is a laminated glazing unit including said first glazing pane made of mineral glass, and, on the side of the second main face, a lamination interlayer made of an optionally tinted thermoplastic polymeric material, and a second glazing pane made of mineral glass optionally including an absorbing and/or scattering layer.

11. The glazing unit as claimed in claim 1, wherein the glazing module is a laminated glazing unit including said first glazing pane made of mineral glass, and including on the second main face side a lamination interlayer made of a thermoplastic polymeric material, and a second glazing pane made of mineral glass.

12. The luminous glazing unit as claimed in claim 1, wherein the glazing module is a laminated glazing unit including said first glazing pane made of mineral glass, a lamination interlayer made of a thermoplastic polymeric material and a second glazing pane made of mineral glass, and wherein the microparticles are bound by the polymeric material forming the transparent matrix.

13. The luminous glazing unit as claimed in claim 10, wherein the lamination interlayer is a PVB or an EVA.

14. The luminous glazing unit as claimed in claim 1, wherein the luminous glazing unit forms an architectural glazing unit or a glazing unit used in furnishings or a means of public transport.

15. The luminous glazing unit as claimed in claim 1, wherein the luminous glazing unit forms an insulating glazing unit that includes an additional glazing pane with third and fourth main faces, the third main face, the innermost, being spaced apart from the glazing module, by a gas-filled cavity, a framing first polymeric seal being arranged on the a periphery of the third main face and making contact with the glazing module.

16. The luminous glazing unit as claimed in claim 15, wherein the luminous glazing unit forms a side window of a train, tram or a subway train, a door of a refrigerated appliance, a window, a skylight, or a glazed door.

17. The luminous glazing unit as claimed in claim 1, wherein the luminous glazing unit forms a planar and tempered, clear or extra-clear single glazing unit, the first glazing pane thus being planar and tempered and clear or extra-clear.

18. The luminous glazing unit as claimed in claim 1, further comprising a profile for mounting the glazing unit, the light source being in a volume between the mounting profile and the edge face of the glazing module, the profile including a web facing the edge face of the glazing module.

19. The luminous glazing unit as claimed in claim 18, wherein the light source includes a set of light-emitting diodes on a PCB carrier and wherein the luminous glazing unit includes a profile bearing the PCB carrier in the volume between the mounting profile and the edge face of the glazing module.

20. The luminous glazing unit as claimed in claim 2, wherein the degree of coverage of the microparticles is at most 1%.

21. The luminous glazing unit as claimed in claim 3, wherein the dielectric material of the shell is mineral glass, silica or a metal oxide.

22. The luminous glazing unit as claimed in claim 7, wherein H1 is at most 2%.

* * * * *